United States Patent
Kato et al.

(10) Patent No.: US 6,669,971 B1
(45) Date of Patent: Dec. 30, 2003

(54) BARLEY AND YAM *NATTO*

(75) Inventors: Keitaro Kato, Kanagawa (JP); Eizo Tejima, Kanagawa (JP); Shigeru Koyama, Kanagawa (JP)

(73) Assignee: Ooyama Tofu Co., LTD, Kanagawa (JP)

( * ) Notice: Subject to any disclaimer, the term of this patent is extended or adjusted under 35 U.S.C. 154(b) by 95 days.

(21) Appl. No.: 10/110,128

(22) PCT Filed: Oct. 26, 2000

(86) PCT No.: PCT/JP00/07612

§ 371 (c)(1),
(2), (4) Date: Apr. 9, 2002

(30) Foreign Application Priority Data

Oct. 28, 1999 (JP) ............................................. 11-345197

(51) Int. Cl.[7] .............................. A23L 1/20; A23L 1/105
(52) U.S. Cl. .............................. 426/46; 426/52; 426/634
(58) Field of Search ............................... 426/46, 49, 52, 426/61, 634, 618, 637

(56) References Cited

U.S. PATENT DOCUMENTS 5,283,059 A * 2/1994 Suzuki et al. ............ 424/93.46

FOREIGN PATENT DOCUMENTS

| JP | 02-119758 | * 5/1990 |
| JP | 2001-136927 | * 5/2001 |

* cited by examiner

*Primary Examiner*—Keith Hendricks
(74) *Attorney, Agent, or Firm*—Rader Fishman & Grauer

(57) ABSTRACT

The present invention provides Natto manufactured by mixing steamed soybean, cooked barley and yam, inoculating *Bacillus subtilis* Natto to the mixture, and fermenting the mixture, which is almost odorless, soft, good taste, and viscous, and further, functional substances such as vitamin $K_2$ and enzyme (Nattokinase and Protease) are remarkably increased. This product may extend the utilization as functional traditional foods relating to prevention of life-style related disease.

3 Claims, No Drawings

BARLEY AND YAM NATTO

This application is a 371 National Stage of PCT/JP00/07612, filed Oct. 26, 2000.

TECHNICAL FIELD

The present invention relates to Natto improved the C/N balance (ratio of carbohydrate and protein) suitable for advancing fermentation of *Bacillus subtilis* Natto ideally, especially to Natto having improved the quality, increased the functional ingredient, softened the hardness to produce viscously, good taste and texture, and high enzyme activity and productivity of Vitamin $K_2$ and the like.

BACKGROUND ART

Natto is fermented soybean that is a traditional Japanese staple, which is an ideal food wherein nutrient in soybean is made well digestible, Vitamin $B_2$ and $K_2$, and various functional enzyme such as nattokinase are produced owing to the working of *Bacillus subtilis* Natto. However, the quality of Natto are influenced so much by the raw materials of soybean, especially particles size of soybean has become smaller due to the consumer's preferences recently, and then the sugar contents of soybean are insufficient comparing with full maturity.

On manufacturing Natto in conventional manner, raw materials of soybean only are steeped in water, boiled with steam, and then *Bacillus subtilis* Natto is inoculated thereunto to be fermented. In this process of fermentation, the protein of soybean are decomposed into peptide and amino acid, and polypeptide of glutamic acid and fructose are polymerized to form γ-polyglutamic acid (γ-PGA) as viscous substance characteristic in Natto. Also, nattokinase is produced in the process, which is noticed as having the function of dissolving thrombus.

Nattokinase is one of protease and has the function to dissolve fibrin in thrombus. This enzyme is characteristic function of *Bacillus subtilis* Natto, and it is said cerebral thrombosis may be prevented by having Natto.

Next, it is noticed function of vitamin $K_2$ as a bonding agent to put calcium on to the human bone by the action of osteocalcin. Calcium is one of the most important minerals from young to old age person, and lack of calcium has a bad influence on forming skeletal structure, especially it may cause osteoporosis to persons of middle or advanced aged female.

Further, active protease exists in Natto, which promotes digestion of protein foods. Furthermore, it is expected that ingested *Bacillus subtilis* Natto stimulates vermiculation of intestines to improve Intestinal Flora together with *Lactobacillus bifidus*, and also expected to prevent food poisoning thanks to Antibiotics of Dipicolinic Acid produced by *Bacillus subtilis* Natto.

DISCLOSURE OF INVENTION

However, soybean of raw materials of conventional Natto tend to use smaller particle sizes due to consumer's taste, and accordingly those sugar contents are low in most cases. If the fermentation is advanced and sugar contents go low, autolysis is promoted and it causes stink of ammonia other than the essential smell of Natto to harm the commercial value. And as time goes on, tyrosine (one of the amino acid insoluble in water) is formed to spoil the texture.

In order to resolve the above-mentioned problems, the applicant noticed to add grains containing sugar and vegetable fiber rich and selected Barley since the ratio of soluble to insoluble fiber is 1 vs. 1 and this ratio is suitable for human health, and further noticed Yam which is used for grated yam soup and compatible with Barley. Yam is rich nutritious and it is said as "foods of eternal youth and longevity" from ancient days. The special viscous substance of Yam is formed with combination of cellulose mannon and protein, which has functions of accelerating absorption of protein and preventing from accumulation of cholesterol.

BEST MODE FOR CARRYING OUT THE INVENTION

Barley and Yam Natto according to the present invention comprises "Soybean", "Barley" and "Yam" as ingredients which has peculiar valuable component respectively. These three ingredients are mixed adding *Bacillus subtilis* Natto and fermentated to obtain a Natto wherein the valuable components are increased greatly. This is the very work by microorganism and synthetic substance cannot attain. It's a marvelous mystery of microorganism.

This Barley Yam Natto has distinctive characters which are strong viscousness and almost odorless, and also it has high enzymatic activity by Nattokinase and Protease et al., and contains large amount of Vitamin $K_2$ (see Table 2). It is good to eat without regard to the characteristics of nations, regional differences or ages thanks to the valuable functionality and odorless.

Also, tyrosine appears so late on this Barley Yam Natto compared with conventional Natto. Tyrosine was not appeared within three weeks preservation in a refrigerator. Further, denaturation due to freezing is less than conventional Natto, and accordingly it is suitable for long-distance transportation such as export.

The present invention will be described more in detail from the following example.

EXAMPLE 60 kg of soybean made in United States (5.5 mm φ or below of particle size and fully ripened) was washed and steeped in water at 20° C. over night. The soybean was steamed for eighteen minutes under the steam pressure of 2.0 kg/cm$^2$ and obtained about 120 kg of steamed soybean. Barley and yam are cooked with an automatic rice cooker spending 20 minutes. Steamed soybean 120 kg and cooked barley and yam 95 kg were mixed with spraying 5×10$^4$ of *Bacillus subtilis* Natto 2 litre. The mixture inoculated *Bacillus subtilis* Natto was filled in predetermined containers made of expanded polystyrene (for 50 g) or special containers made of polypropylene (for 40 g), and fermented them in a fermentation room at 40–42° C. (maximum temperature of product 50° C.) for 18 hours.

After fermentation, put in a refrigerator at 5° C. over night. Obtained Barley Yam Natto was compared with ordinary Natto on the market as for quality, nutritive substance and functional property as follows.

TABLE 1

(Comparison of Quality)

| | Appearance (covering of mycelium) | Viscosity | Hardness | Smell | Taste/ Flavor | pH | Precipitation of tyrocine | Degeneration of freezing |
|---|---|---|---|---|---|---|---|---|
| Barley and Yam Natto | good | good | soft * (50 g/P) | almost nil | good | 6.5 | not precipitated even after 3 weeks | almost nil |
| Ordinary Natto on market | usual | usual | usual * (70 g/P) | smelled | usual | 7.5 | precipitated after 8 days | degenerated a little |

* Note: Measured by Reometer (Reological cutting Kinetics)

TABLE 2

(Comparison of nutritive substances and functional property per 100 g)

| Items | Ordinary Natto on market | Barley & Yam Natto (Present Invention) | Functional Property |
|---|---|---|---|
| Calorie | 200 Kcal | 140 Kcal | decreased by 30% |
| Protein | 16.5 g | 10.8 g | |
| Lipid | 10.0 g | 5.9 g | decreased by 40% |
| Sugar Content | 9.8 g | 11.0 g | |
| Vitamin $K_2$ | 870 µg | 1,710 µg | increased to about twice |
| Nattokinase | 7,100 cu | 42,400 cu | increased to 6 times |
| Protease | 4,400 u | 10,100 u | increased to about twice |
| Cholesterol | 0 | 0 | |

As shown in the above Tables 1 and 2, Barley & Yam Natto is softer, almost odorless, may keep for a longer time and has better taste and texture comparing conventional ordinary Natto. Further, from the point of view of nutritive substances, the calorie is lower and lipid is decreased by 40%. Furthermore, from the point of view of the functional property, it contains about twice of vitamin $K_2$ and 6 times of nattokinase having the function of dissolving thrombus. Accordingly, it is expected to prevent osteoporosis and thrombosis et al., and also expected to show great effect for preventing life-style related disease.

INDUSTRIAL APPLICABILITY

In coming an aging society, it is required that functional foods such as mentioned above will accomplish disease prevention at home and abroad. It is highly anticipated that medical treatment of disease may be conducted with use of safe medicines while prevention of disease may be conducted with use of functional foods useful for promoting health. It is a mission of food industry to construct a healthy and happy society using such functional foods. Barley & Yam Natto according to the present invention is very useful therefor.

What is claimed is:

1. Natto comprising soybean, barley and yam, wherein the Natto is manufactured by the steps of:

steaming soybean, and cooking barley and yam;

mixing steamed soybean and cooked barley and yam;

inoculating *Bacillus subtilis* Natto to the mixture by spraying while mixing; and fermenting the mixture in a fermentation room.

2. Natto according to claim 1, wherein ratio of the barley and yam in total weight is in the range of 30% to 45% by weight.

3. Method for manufacturing Natto comprising the steps of:

steaming soybean, and cooking barley and yam;

mixing steamed soybean and cooked barley and yam, ratio of the barley and yam in total weight being in the range of 30% to 45% by weight;

inoculating *Bacillus subtilis* Natto to the mixture by spraying while mixing; and fermenting the mixture in a fermentation room.

* * * * *